United States Patent
Haberman et al.

(10) Patent No.: US 9,856,151 B2
(45) Date of Patent: Jan. 2, 2018

(54) MULTISTAGE FILTRATING PRE-TREATMENT FOR DESALINATION OF OILFIELD PRODUCED WATER

(71) Applicant: RWL WATER ISRAEL LTD, Karmiel (IL)

(72) Inventors: Assaf Haberman, Ramat Yishay (IL); Ravid Levy, Massad (IL)

(73) Assignee: Fluence Corporation LLC, White Plains, NY (US)

(*) Notice: Subject to any disclaimer, the term of this patent is extended or adjusted under 35 U.S.C. 154(b) by 293 days.

(21) Appl. No.: 14/270,692

(22) Filed: May 6, 2014

(65) Prior Publication Data
US 2014/0332473 A1 Nov. 13, 2014

Related U.S. Application Data

(60) Provisional application No. 61/821,566, filed on May 9, 2013.

(51) Int. Cl.
*C02F 1/00* (2006.01)
*C02F 1/52* (2006.01)
(Continued)

(52) U.S. Cl.
CPC ............ *C02F 1/004* (2013.01); *B01D 17/047* (2013.01); *B01D 24/06* (2013.01);
(Continued)

(58) Field of Classification Search
CPC .......... C02F 1/004; C02F 1/008; C02F 1/441; C02F 1/444; C02F 2303/16; C02F 2303/24; C02F 2101/32; C02F 2103/365; C02F 1/529; C02F 1/681; C02F 1/682; C02F 9/00; C02F 2101/325; C02F 2103/10; C02F 2101/365; C02F 2209/03; C02F 2301/08; B01D 24/4636; B01D 24/4884; B01D 27/00; B01D 27/101; B01D 29/07;
(Continued)

(56) References Cited

U.S. PATENT DOCUMENTS 6,273,031 B1 * 8/2001 Verdegan ........... F01M 11/0458
123/1 A
6,500,344 B1 * 12/2002 Lee ........................ B01D 24/08
210/107
(Continued)

OTHER PUBLICATIONS

Chris Jeffery, ZeeWeed MBR Technology Update, ZENON Environmental Inc, 2005.*
(Continued)

*Primary Examiner* — Lucas Stelling
*Assistant Examiner* — Angel Olivera
(74) *Attorney, Agent, or Firm* — Schwegman Lundberg & Woessner, P.A.; Ariel Reinitz

(57) ABSTRACT

A method and system for treating oilfield produced water is disclosed. The method includes passing oilfield produced water through a chain of filters, first filter configured to filter particles of a size larger than 10 μm from the water, a second filter configured to filter remaining particles of a size larger than 2 μm from the water and a third filter configured to filter remaining particles of a size larger than 0.5 μm from the water and automatically cleaning at least one of the filters.

8 Claims, 2 Drawing Sheets

(51) Int. Cl.
| | |
|---|---|
| C02F 1/68 | (2006.01) |
| C02F 9/00 | (2006.01) |
| E21B 21/06 | (2006.01) |
| B01D 17/04 | (2006.01) |
| B01D 37/04 | (2006.01) |
| B01D 24/06 | (2006.01) |
| B01D 24/46 | (2006.01) |
| B01D 24/48 | (2006.01) |
| B01D 29/00 | (2006.01) |
| B01D 29/07 | (2006.01) |
| B01D 29/64 | (2006.01) |
| B01D 36/02 | (2006.01) |
| B01D 37/03 | (2006.01) |
| B01D 27/10 | (2006.01) |
| B01D 29/68 | (2006.01) |
| B01D 27/00 | (2006.01) |
| C02F 101/32 | (2006.01) |
| C02F 103/10 | (2006.01) |
| C02F 1/44 | (2006.01) |
| C02F 103/36 | (2006.01) |

(52) U.S. Cl.
CPC ..... *B01D 24/4636* (2013.01); *B01D 24/4884* (2013.01); *B01D 29/0068* (2013.01); *B01D 29/07* (2013.01); *B01D 29/6415* (2013.01); *B01D 36/02* (2013.01); *B01D 37/03* (2013.01); *B01D 37/046* (2013.01); *C02F 1/529* (2013.01); *C02F 1/681* (2013.01); *C02F 1/682* (2013.01); *C02F 9/00* (2013.01); *E21B 21/063* (2013.01); *E21B 21/068* (2013.01); *B01D 27/00* (2013.01); *B01D 27/101* (2013.01); *B01D 29/6407* (2013.01); *B01D 29/6438* (2013.01); *B01D 29/68* (2013.01); *B01D 2221/04* (2013.01); *B01D 2257/702* (2013.01); *C02F 1/008* (2013.01); *C02F 1/441* (2013.01); *C02F 1/444* (2013.01); *C02F 2101/32* (2013.01); *C02F 2101/325* (2013.01); *C02F 2103/10* (2013.01); *C02F 2103/365* (2013.01); *C02F 2209/03* (2013.01); *C02F 2301/08* (2013.01); *C02F 2303/16* (2013.01)

(58) Field of Classification Search
CPC .................. B01D 29/0068; B01D 29/68; B01D 29/6407; B01D 29/6415; B01D 29/6438; B01D 36/02; B01D 37/03; B01D 37/046; B01D 2221/04; B01D 2257/702; E21B 21/63

See application file for complete search history.

(56) References Cited

U.S. PATENT DOCUMENTS

| | | | |
|---|---|---|---|
| 2010/0038310 A1* | 2/2010 | Shafer | C02F 9/00 210/605 |
| 2010/0116647 A1* | 5/2010 | Kornmuller | B63J 4/004 204/228.1 |

OTHER PUBLICATIONS

"Colombian Application Serial No. 14098834, Office Action dated Apr. 18, 2017", 7 pgs.

* cited by examiner

MULTISTAGE FILTRATING PRE-TREATMENT FOR DESALINATION OF OILFIELD PRODUCED WATER

CROSS REFERENCE TO RELATED APPLICATIONS

This application claims the benefit of U.S. Provisional Application Ser. No. 61/821,566, filed on May 9, 2013 and entitled "MULTISTAGE FILTRATION PRE-TREATMENT FOR DESALINATION OF OILFIELDS PRODUCED WATER" which is incorporated in its entirety herein by reference.

BACKGROUND

Onshore oil drilling usually involves the production of a byproduct in the form of wastewater. Water is usually located above the oil layer in the ground. Water containing oil is often the first product of oil drilling. Treatment of such wastewater from onshore oil wells poses several challenges. Most commercial onshore processes, when ocean discharge is not available, include reducing the oil content in the water to approximately below 10 mg/liter, removing coarse particles and then injecting the received oilfield produced water via a deep aquifer injection. In some cases oilfield produced water cannot be used without further treatment due to excessive contamination and high salt levels. In such cases, a further reduction of pollutants and oil should be achieved and the water should be desalinated to meet stricter environmental regulations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
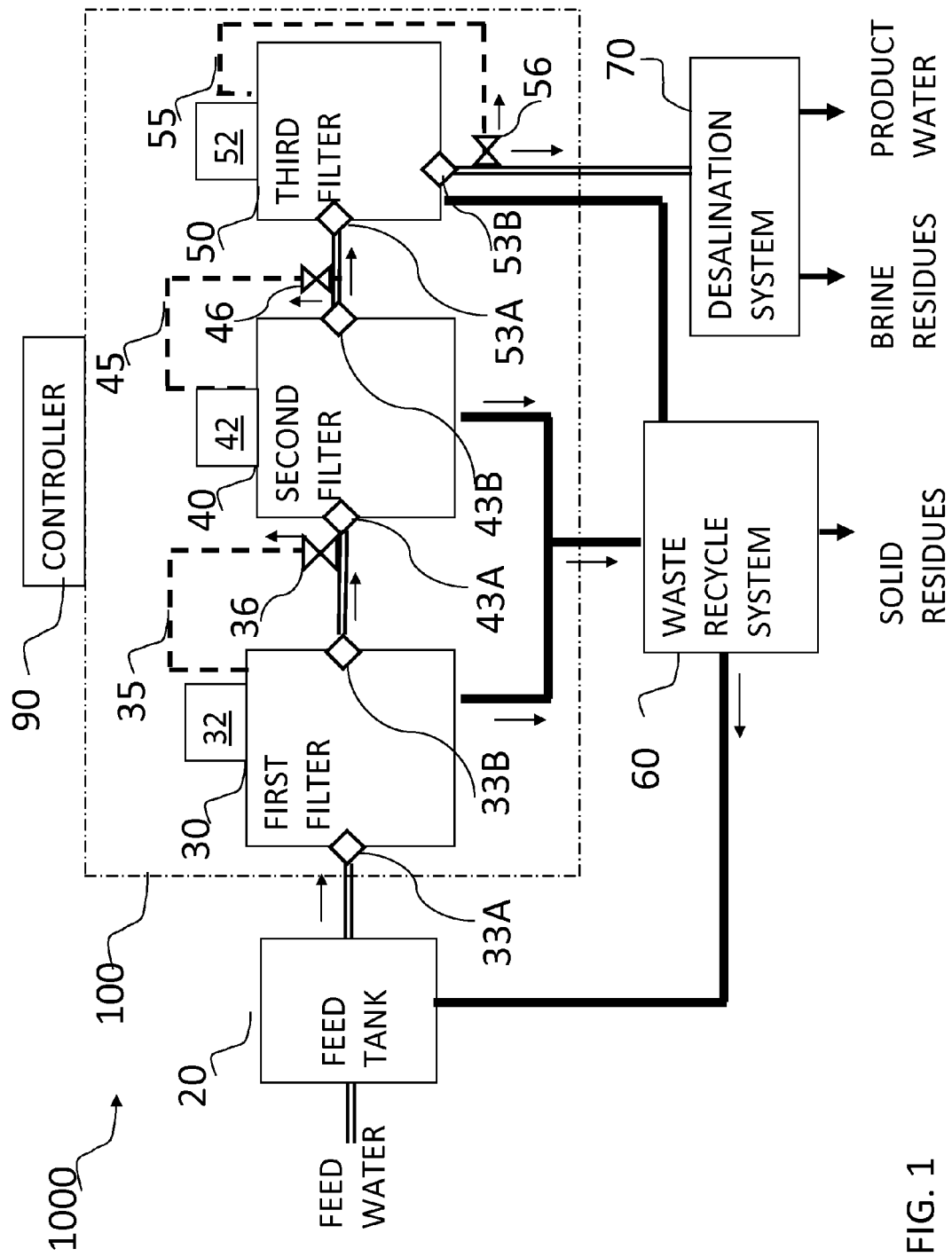
FIG. 1 is a high level block diagram of an exemplary system for treating feed water according to some embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments of the invention are directed to a system and method for treating oilfield produced water. FIG. 1 is a high level block diagram of an exemplary water treatment system. Water treatment system 1000 may include a feed tank 20 to receive oilfield produced feed water, a water filtering system 100, a waste recycle system 60 and a desalination system 70. Filtering system 100 may include a chain of three filters, a first filter 30, also refers herein as a coarse filter, a second filter 40, also refers herein as a fine filter and a third filter 50, and also refers herein as an extra-fine filter. After exiting system 100, the treated water may be forwarded to desalination system 70 to undergo a desalination process.

System 1000 may include three main types of pipes for various liquids. The water to be treated and the treated water between the different stages of filtering are passes in a main piping system, marked in double-line, the waste water from the various cleaning stages is delivered in waste pipes, marked in bold dark lines and the recycled water used to clean the filters at each of the filtering stages is marked in dashed lines.

The oilfield produced water (feed water) may be received at feed tank 20 after preliminary filtering treatment of water produced from crude oil drilling. Oilfield produced feed water may contain salts, residual oils, hydrocarbons, solids, and other contaminants. The feed water is collected in feed tank 20 prior to feeding into system 100. Feed tank 20 may be any tank configured to receive, collect and supply oilfield produced feed water. Tank 20 may be made of or coated by a corrosive resistant material.

System 100 may be configured to reduce the contamination in the oilfield produced feed water to levels suitable for a desalination process, for example, the water treated by system 100 may include less than 0.1 mg/liter of residual oil and grease, less than 3 mg/liter total organic carbon (TOC), less than 1 mg/liter of other hydrocarbons, less than 2 mg/liter total suspended solids (TSS) and less than 0.5 Nephelometric Turbidity Units (NTU).

Although system 100 is described herein as having three consecutive filters, it should be understood to a person skilled in the art, that embodiments of the invention are not limited in that respect and having two, four, five and more filters is within the scope of the invention. For example, according to some embodiments, the system may include two filters, for example, any combination of first filter 30, second filter 40 and third filter 50. According to other embodiments, the system may include four filters.

First filter 30 may be any filter configured to filter relatively coarse particles larger than 10 μm, for example, in a range of, 11 μm-40 μm. First filter 30 may include a mesh or a screen for filtering such coarse particles. First filter 30 may further be configured to be automatically cleaned. During operation, first filter 30 would be prone to be at least partially blocked by a mixture of the coarse particles and residual oil since such commercial industrial filtering units are not designed to filter a combination of relatively viscous oil, sand and other hydrocarbon particles.

In some embodiments, system 100 may further comprise a first cleaning system 32 for cleaning first filter 30. System 32 may be configured to wash the coarse filter with treated water, for example, water taken from a first circulation pipe 35 by opening a first valve 36. System 100 may further include at least one pressure gauge 33A and/or 33B and cleaning system 32 may be automatically operated to clean filter 30 based on the pressure drop measured by the pressures gauges is above a first threshold value. For example, when the water pressure at the entrance and exit of first filter 30 measured between pressure gauges 33A and gauge 33B, drops below a predetermined threshold value (e.g., drop of 1 bar from the initial pressure) the meshes or screens in filter 30 may be automatically cleaned, by opening valve 36 and letting water flow in first circulation pipe 35 to remove the blockage layer from the surface of the filter.

In some embodiments, cleaning system 32 may clean first filter 30 by diversion of the feed pressure via suction nozzles. Alternatively or additionally, cleaning system 32 may include a rotating brush assembly. The waste water from the cleaning procedure may be passed to waste stream recycle unit 60 to remove solid residuals which were accumulated during the cleaning procedure and directed the water may be back to feed tank 20 to be further processed by system 100. Recycle unit 60 may include for example a dissolved air flotation system (DAF) or dissolved gas flotation system (DGF) with chemical additives for separation of solids and oils. DAF sludge may then be dewatered in a decanter centrifuge. The dewatered sludge (e.g., having approximately 30% dry solids) may be disposed as solid waste and water from both the DAF & decanter may be recycled to feed tank 20.

From first filter 30, the water may pass to second filter 40. Second filter 40 may be configured to filter particles larger than 2 µm. For example, filter 40 may be a thread filter. As known in the art, a thread filter includes textile fibers arranged in a cassette-like element for filtering the water. In some embodiments, second filter 40 may include one or more filtering elements. Second filter 40 may be configured to filter particles larger than 2 µm, for example, in a range of 3 µm-9 µm. Oil droplets and other particles may be accumulated on the surface of the fibers of second filter 40, blocking the fibers.

In some embodiments, second filter 40 may be automatically cleaned when the pressure drop related to second filter 40 is above a second threshold value. System 100 may further include a second cleaning system 42 for cleaning second filter 40. Second cleaning system 42 may include water jets. System 100 may further include at least one pressure gauge 43A and/or pressure gauge 43B for measuring the water pressure drop related to second filter 40. For example, when a pressure difference between the pressure at the entrance to filter 40 measured by gauge 43A and the pressure at the exit of filter 40 measured by gauge 43B is above 0.5 bar, system 42 may automatically clean filter 40. Second cleaning system 42 may include high pressure water jets to remove the accumulated particles and oil. The water may be taken via a second circulation pipe 45 by opening second valve 46 or from a dedicated tank (not illustrated) using any water pumps and may further be injected into filter 40 forming water jets at a pressure of at least 5 bar, for example, 5-10 bar, or more.

Filter 40 may include textile microfibers (for example, a 10 micron microfiber diameter) wound over a rigid grooved base plate (a cassette). Feed water may flow through the thread layers into the grooves and may further be channeled to specially designed outlets. The filter cassettes may be mounted on at least one hollow pipe. The exemplary filter may be automatically cleaned using high-pressure water jet sprays through the thread layers that may hit the grooved base plate and may further be rejected back through the layers again. The contaminants may be carried off from the cassettes by the reject stream. Therefore, no dirt passes through the filter during back-flush. The filtration mechanics may include a combination of surface and depth filtration.

In some embodiments, second filter 40 may be periodically cleaned using a chemical cleaning agent such as a detergent. Filter 40 may be immersed in a water solution comprising water (e.g., from second pipe 45) and a detergent for cleaning oil, for example, a detergent comprising terpenes. Following the immersion, filter 30 may be washed (e.g., twice) by treated water from second pipe 45 to clean the detergent from the filter, for example, to clean the detergent from the textile fibers. Filter 40 may be chemically cleaned periodically, for example, once a day, once a week, once a month or at any chosen time. The waste water from the two cleaning procedures (water jets and detergents) may be passed to a waste stream recycle tank 60.

Third filter 50 may be any filter configured to filter particles larger than 0.5 µm, for example, in a range of 0.6 µm-1.9 µm or more. Third filter 50 may include a cartridge filter or any other filter configured to separate such extra-fine particles from water.

In some embodiments, third filter 50 may be automatically cleaned when the pressure drop related to third filter 50 is above a third threshold value. System 100 may further include a third cleaning system 52 for cleaning third filter 50. Third cleaning system 52 may include water jets. The waste products from cleaning third filter 50 may pass to waste recycling system 60, for further treatment. System 100 may further include at least one pressure gauge 53A and/or pressure gauge 53B for measuring the pressure drop related to third filter 50. For example, when a pressure difference between the pressure at the entrance to filter 50 measured by gauge 53A and the pressure at the exit of filter 50 measured by gauge 53B is above 2 bar, system 52 may automatically clean filter 50. Third cleaning system 52 may include a water backwash mechanism to remove the accumulated particles and oil. The water may be taken via a second circulation pipe 55 by an opening valve 56 or from a dedicated tank (not illustrated) using any water pumps to allow backflow of water through the filter.

System 1000 may further include one or more controllers 90 to control the filtering process. Controller 90 may be coupled to the cleaning systems and may be configured to automatically instruct each of cleaning systems 32, 42 and/or 52 to clean filters 30, 40 and/or 50, respectively. Further, controller 90 may be coupled to valves 36, 46 and/or 56 to open and allow flow of water into pipes 35, 45 and 55, respectively. Controller 90 may further be configured to control waste recycle system 60 and/or desalination system 70. Controller 90 may further be configured to receive from measurements results from gauges 33A, 33B, 43A, 43B, 53A and/or 53B measurements.

Controller 90 may include at least one processor, at least one memory, at least one data storage unit and a user interface. The processor may be any computing platform that is configured to execute methods or instructions stored in the memory, for example, the processor may include a CPU. The memory may be any non-transitory memory that may include codes, instructions and methods to be executed by the processor. For example, the memory may include codes or instructions related to a method of treating oilfield produced water according to embodiments of the invention. Controller 90 may further include data storage for storing data related to the method, for example, data related to the first, second and third threshold values. Controller 90 may include a user interface that may allow a user to communicate with the controller. The user interface may include any suitable number and types of input and/or output devices.

After being treated in system 100, the treated water may further undergo any desired desalination process, for example for producing water suitable for agricultural, domestic and/or industrial usages. The treated water may pass through desalination system 70. Desalination system 70 may be any desalination system utilizing for example, reverse osmosis. After completing the entire filtering and desalination processes the total solid waste produced both by waste recycle system 60 and desalination system 70 is 10-15% of the produced oilfield water volume. The remaining 85-90% is high quality water suitable for agricultural, industrial and/or domestic use.

Figure 2:
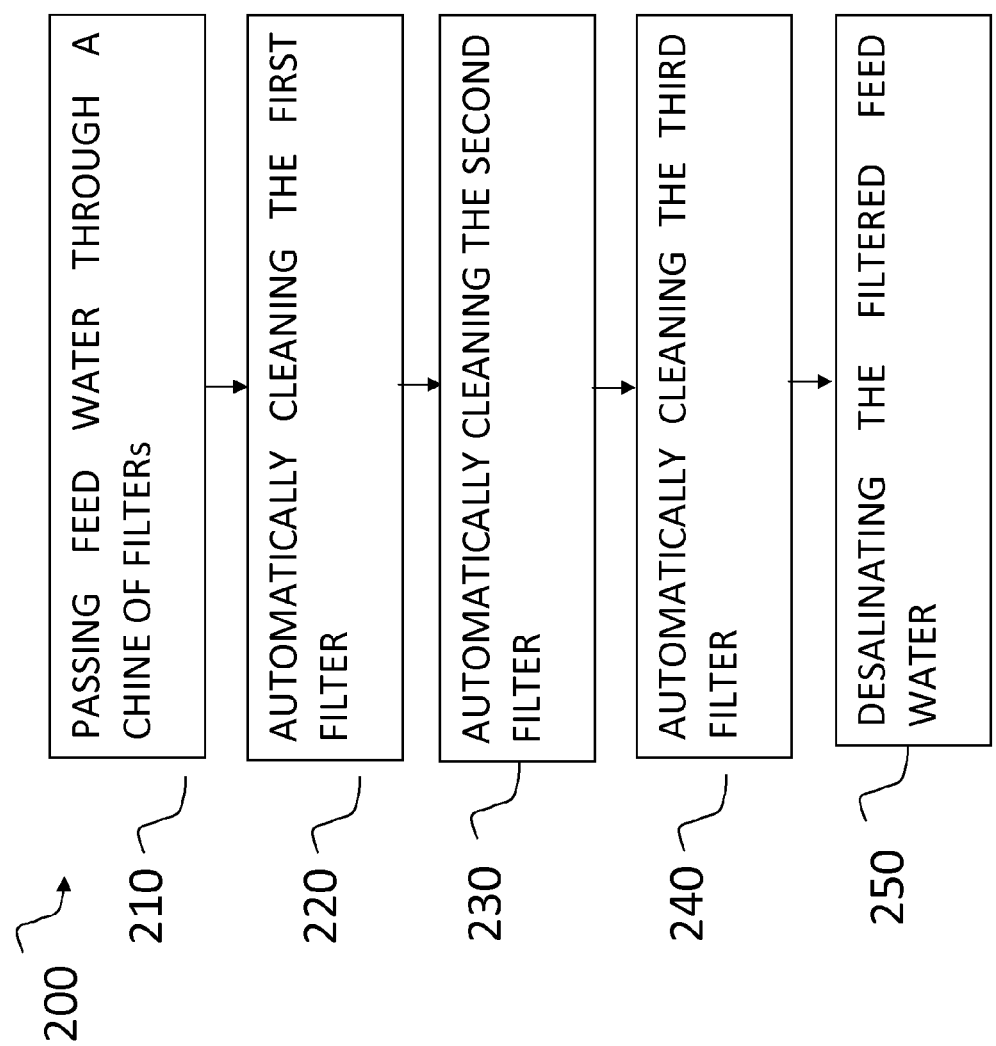
FIG. 2 is a flowchart of a method for treating feed water according to some embodiments of the invention.

Reference is now made to FIG. 2 illustrating a method of treating oilfield produced feed water according to some embodiments of the invention. The method may be performed using system 1000 or any other suitable system. In operation 210, the method may include passing the oilfield produced water through a chain of filters, the chain may include a first filter (e.g., first filter 30) configured to filter particles of a size larger than 10 µm from the water, a second filter (e.g., second filter 40) configured to filter remaining particles of a size larger than 2 µm from the water and a third filter (e.g., third filter 50) configured to filter remaining particles of a size larger than 0.5 µm from the water. The feed water may include residual oil and additional contaminations, such as solids particles, salts and other hydrocarbons. The feed water may be oilfield produced water after that already had initial filtering.

In operation 220, the method may include automatically cleaning the first filter when a first pressure drop related to the first filter is above a first threshold value. Controller 90 may receive from gauges 33A and/or 33B data or value related to the pressure drop in the first filter. The controller may compare the received value with the first threshold value stored in a data storage associated with the controller. If the received value is above the first threshold value, the controller may cause a first cleaning system (e.g., first cleaning system 32) to clean the first filter. The first filter may be cleaned by washing the first filter with treated water. For example, the controller may operate or cause valve 36 to open and allow the flow of treated water from pipe 35 to be used for washing the first filter, alternatively or additionally the controller may operate a rotating brush assembly to clean the first filter. The contaminated layer may include oil and coarse particles from the feed water.

In operation 230, the method may include automatically cleaning the second filter when a pressure drop related to the second filter is above a second threshold value. Controller 90 may receive from gauges 43A and/or 43B data or value related to the pressure drop in the second filter. The controller may compare the received value with the second threshold value stored in a data storage associated with the controller. If the received value is above the second threshold value, the controller may cause a second cleaning system (e.g., second cleaning system 42) to clean the second filter. The second filter may be cleaned by water jets having a pressure larger than 5 bars. The controller may operate or cause valve 46 to open and allow the flow of treated water to pipe 45 to feed the water jets in cleaning system 42. The water in system 42 may be pumped to increase the pressure, using any suitable water pump, to be further injected into the second filter using water jets. The water jets may mechanically remove a contaminated layer comprising of oil and particles from the filter, e.g., from the textile fibers.

In some embodiments, the method may include periodically cleaning the second filter using a detergent for removing oil. The cleaning process may be performed using any cleaning method. For example, a cleaning in place (CIP) method may be used to clean the filter on cite without disassembling the filter. The cleaning may be performed using any detergent for cleaning oil, for example a detergent comprising terpenes. An exemplary cleaning procedure may include the following operations: treated water, for example from pipe 45, may be used for washing (e.g., twice) the second filter. The second filter may be isolated by blocking the entrance and exit of the feed water. The second filter may be further immersed in a solution containing treated water and the detergent, by letting the solution flow in a close circle, for example, for one hour. The detergent solution may be extracted and the filter may be washed (e.g., twice). This operation may be carried out periodically, for example, once a day, once a week, once a month or more. The waste water from the process may pass to waste recycle system 60 for further recycling.

In operation 240, the method may include automatically cleaning the third filter when a third pressure drop related to the third filter is above a third threshold value. Controller 90 may receive from gauges 53A and/or 53B data or value related to the pressure drop in the third filter. The controller may compare the received value with the third threshold value stored in the data storage associated with the controller. The received value is above the third threshold value, the controller may cause a third cleaning system (e.g., third cleaning system 42) to clean the third filter. The third filter may be cleaned by backflow of filtered water, which may include detergents or other cleaning chemicals.

In operation 250, the method may include desalinating the filtered feed water. The treated water at the end of the filtering process in operation 210 may include less than 3 mg/liter of total organic carbon (TOC), thus may be suitable for processing by any desalination system, for example, system 70.

In some embodiments, the method may include additional operations for improving the filtering performance of any one of the first filters, the second filer and/or the third filter. For example, the method may include adding additives (e.g., a coagulant material) to the feed water that improves the ability of the filters to catch and trap the residual oil and the particles from the feed water. A coagulant material may be any material configured to cause coagulation of fine particles into larger particles, which are trapped more easily by the filters. For example, the coagulant material may include ferrous salts or any other organic or inorganic coagulant materials. The coagulant material may be added at one or more stages of the filtering process, for example, prior to passing through the first filter, prior to passing through the second filter or prior to passing through the third filter. In some embodiments, the method may include adding demulsifiers, also known as, emulation breakers to separate the oil-water emulsion thus allow better separation of the oil from the water. The demulsifiers may be added at one or more stages of the filtering process, for example, prior to passing through the first filter, prior to passing through the second filter or prior to passing through the third filter. The demulsifier may include at least one of acid catalyzed phenol-formaldehyde resins, base catalyzed phenol-formaldehyde resins, epoxy resins, polyethylene imines, polyamines, di-epoxides and polyols.

EXAMPLES

An exemplary composition and properties of oilfield produced feed water that were measured prior to entry to a filtering system according to some embodiments of the invention is presented in Table 1.

TABLE 1

| Physical Properties | Value |
|---|---|
| Temperature, ° C. | 25-45 |
| pH | 7.5-8.5 |
| Conductivity [mS] | 1.4 |
| Composition | Amount |
| Cl [mg/l] | 150-180 |
| $SiO_2$ [mg/l] | 25-35 |
| Oil & grease [mg/l]] | 1-5 |
| Hydrocarbons [mg/l] | <10 |
| TSS [mg/l] | <5 |
| TOC [mg/l] | <10 |

An exemplary system 100 was used to treat oil-field produced water having the composition and properties given in Table 1. At the end of the filtering process after passing through the first, second and third filters, the treated water had the composition and properties listed in Table 2.

TABLE 2

| Physical Properties | Value |
|---|---|
| pH | 7 |
| Conductivity [mS] | 1.4 |
| Turbidity [NTU] | <0.5 |
| Composition | Amount |
| Cl [mg/l] | NA |
| Na [mg/l] | NA |
| Oil & grease [mg/l]] | <0.2 |
| Hydrocarbons [mg/l] | <1 |
| TSS [mg/l] | <1 |
| TOC [mg/l] | <3 |

As can be seen, the amount of TSS, oil & grease and Hydrocarbons was reduced dramatically to a level that allows further desalinating of the treated water using any desalination process such as reverse osmosis.

Another exemplary system comprising three filtering stages was examined. The system included a first filter for filtering particles larger than 25 μm and a third extra-fine cartridge filter for filtering particles larger than 1 μm, as disclosed above with respect to first filter 30 and third filter 50. The first filter was an ABS screen filter with 25 micron screen and suction cleaning. The system further included a second filter for filtering particles up to 7 μm, comprising textile microfibers having an automatic cleaning abilities (e.g., filter 40) according to some embodiments of the invention. The second filter was an AMF filter with 7 micron cassettes and high pressure cleaning. Results showing the water pressure drop of the second filter as a function of time are given in Table 3. Table 3 summaries measurements of water pressure drop ΔP in bars on the second filter as function of operation time [days].

TABLE 3

| Day | ΔP [bar] |
|---|---|
| 2 | 2 |
| 4 | 2 |
| 6 | 2 |
| 8 | 2 |
| 10 | 3 |
| 12 | 3 |
| 14 | 3 |
| 16 | 3 |
| 18 | 4 |
| 20 | 4.5 |

The examined system having automatic cleaning abilities, showed an excellent performance with only a small increase in the pressure drop. After approximately 20-30 days, the second filter was further cleaned using a detergent to restore the filtering abilities of a completely new filter.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method of treating oilfield produced water, the method comprising:
   adding coagulant material to the oilfield produced water, the coagulant material comprising material that causes coagulation of particles within the oilfield produced water;
   passing the oilfield produced water having the coagulant material added through a first filter, the first filter being a screen filter having a first pressure gauge positioned at an entrance to the screen filter and a second pressure gauge positioned at the exit of the screen filter and configured to filter from the water particles of a size larger than 10 μm;
   adding a demulsifier to water received from the first filter, the demulsifier comprising material that causes separation of oil from the water received from the first filter;
   passing the water received from the first filter having the demulsifier added through a second filter, the second filter being a thread filter comprising (a) one or more grooved base plates mounted on at least one hollow pipe and (b) one or more layers of textile microfibers wound over the one or more grooved base plates, and having a third pressure gauge positioned at an entrance to the thread filter and a fourth pressure gauge positioned at the exit of the thread filter, the thread filter being configured to filter from the water remaining particles of a size larger than 2 μm; and
   passing the water received from the second filter through a third filter configured to filter remaining particles of a size larger than 0.5 μm from the water;
   when a difference between (a) pressure measured by the first pressure gauge positioned at the entrance to the screen filter and (b) pressure measured by the second pressure gauge positioned at the exit of the screen filter is above a first threshold value, automatically cleaning the screen filter by (i) opening a first valve to allow treated water from a first circulation pipe to remove a blockage layer from a surface of the screen filter and (ii) operating a rotating brush assembly to clean the screen filter; and when a difference between (a) pressure measured by the third pressure gauge positioned at the entrance to the thread filter and (b) pressure measured by the fourth pressure gauge positioned at the exit of the thread filter is above a second threshold value, automatically cleaning the thread filter using one or more high-pressure water jets that spray water through the one or more layers of textile microfibers wound over the one or more grooved base plates, such that the water sprayed by the high-pressure water jets hits the one or more grooved base plates and is further rejected back through the one or more layers of textile microfibers to carry contaminants off the one or more grooved base plates.

2. The method of claim 1, further comprising:
automatically cleaning the third filter when a third pressure drop related to the third filter is above a third threshold value.

3. The method of claim 1, wherein the oilfield produced water to be treated comprises less than 20 mg/liter oil and grease.

4. The method of claim 1, wherein cleaning the first filter is by washing the first filter with treated water.

5. The method of claim 1, wherein the water jets spray water at a pressure larger than 5 bars and smaller than 10 bars.

6. The method of claim 1, further comprising:
periodically cleaning the second filter using a detergent for removing oil.

7. The method of claim 1, wherein after passing the water through the third filter the water contains less than 0.2 mg/liter residual oil.

8. The method of claim 1, wherein after passing the water through the third filter the water contains less than less than 3 mg/liter total organic carbon (TOC).

* * * * *